United States Patent Office.

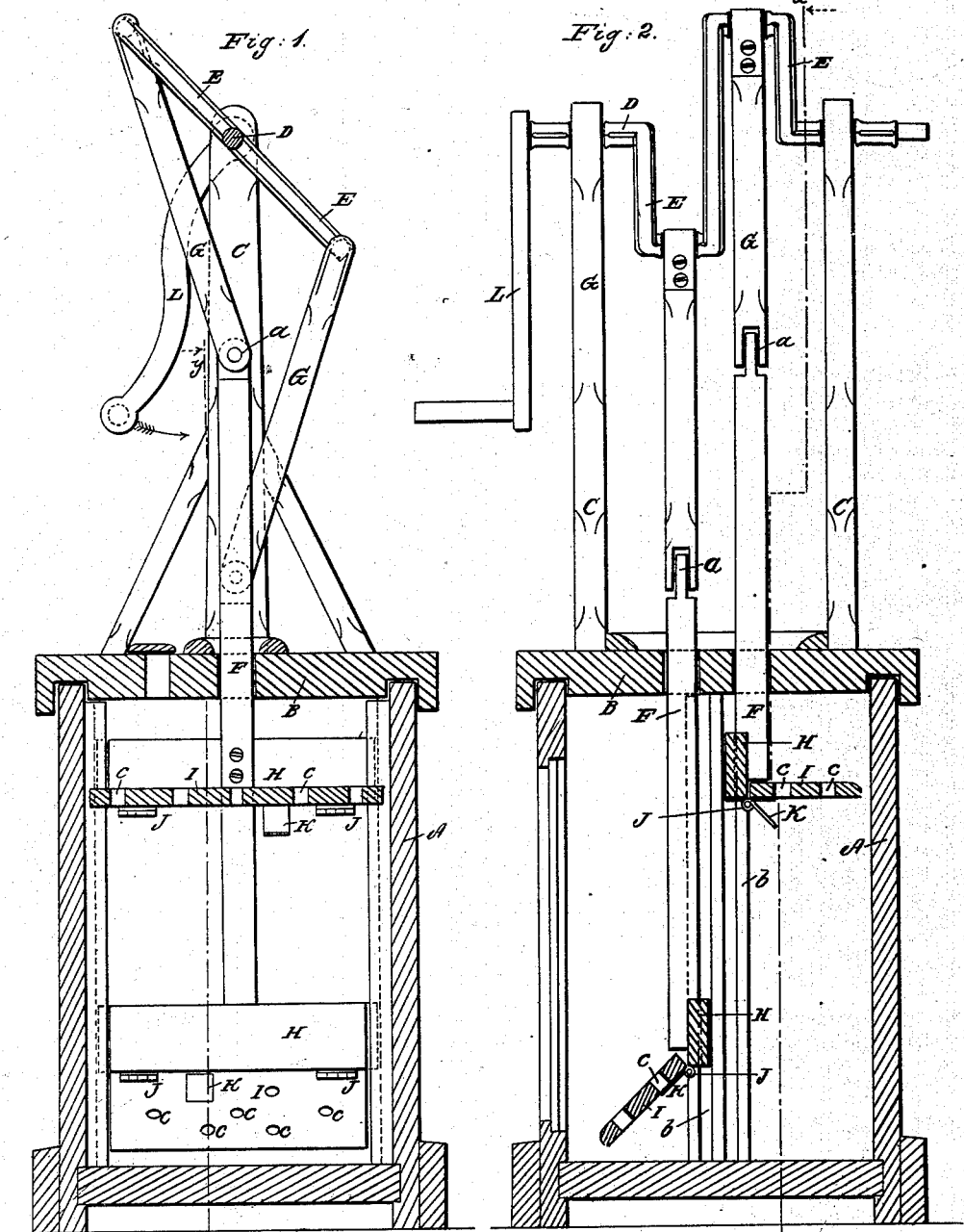

B. L. WINNER, OF BELVIDERE, ILLINOIS.

IMPROVEMENT IN CHURNS.

Specification forming part of Letters Patent No. 49,464, dated August 15, 1865.

*To all whom it may concern:*

Be it known that I, B. L. WINNER, of Belvidere, in the county of Boone and State of Illinois, have invented a new and Improved Churn; and I do hereby declare that the following is a full, clear, and exact description thereof, which will enable others skilled in the art to make and use the same, reference being had to the accompanying drawings, forming part of this specification, in which—

Figure 1 represent a vertical section of my invention, taken in the line $x\ x$, Fig. 2; Fig. 2, a vertical section of the same, taken in the line $y\ y$, Fig. 1.

Similar letters of reference indicate like parts.

This invention relates to a new and improved churn of that class in which two reciprocating dashers are employed; and it consists in the combination of oblique stops, hereinafter described, and dashers attached to their rods by a joint or hinge and having stops attached to the rods; all being arranged in such a manner that the dashers, when descending or being forced down through the cream, will be kept in a horizontal position, so as to act efficiently upon the cream, and when ascending allowed to bend down, so as to offer but little resistance to the cream, and thereby admitting of the churn being operated with but a moderate expenditure of power.

A represents the body of the churn, which may be of rectangular form, and provided with a lid, B, having two standards, C C, upon it, in the upper parts of which there is fitted a horizontal shaft, D, provided with two cranks, E E, having reverse positions.

F F are two rods, which are connected by links G G with the cranks E E, the links being connected by joints $a$ with the rods F. The lower ends of the rods F have cross-bars H attached to them, the ends of which are fitted between guides $b$ at two opposite sides of the body A of the churn.

I I represent the dashers, which are of rectangular form, perforated with holes $c$, and attached by hinges J to the cross-bars H at the lower ends of the rods F. These dashers are allowed to turn down; but they cannot ascend above a horizontal plane, as the lower ends of the rods F serve as stops for them. The bars H have each a sheet-metal plate attached to them, and these plates have an inclined position, being at an angle of about forty-five degrees, and serving as stops or supports for the dashers, preventing them from inclining downward beyond the angle aforesaid. (See Fig. 2.)

The shaft D is provided with a crank, L, for the purpose of turning it, and it may also have a fly-wheel upon it. By turning the shaft D the dashers I I will move simultaneously in opposite directions, one rising as the other falls, the descending dasher having a horizontal position and acting efficiently upon the cream, while the ascending dasher yields or turns down, resting or bearing against its stop H, so that it may pass freely upward through the cream.

By this arrangement the churn may be operated with a moderate expenditure of power and the cream agitated in such a manner as to cause the butter to be quickly produced.

I claim as new and desire to secure by Letters Patent—

The combination of the oblique stops K with hinged dashers I and bars H, all constructed, arranged, and operating as specified.

B. L. WINNER.

Witnesses:
WM. H. GILMAN,
F. A. HULL.